United States Patent [19]

Hamill et al.

[11] 4,118,245

[45] Oct. 3, 1978

[54] METHOD FOR PRODUCING CLAY SLURRIES

[75] Inventors: Herbert R. Hamill, Iselin; David E. Potts, Millington, both of N.J.

[73] Assignee: Engelhard Minerals & Chemicals Corporation, Edison, N.J.

[21] Appl. No.: 833,861

[22] Filed: Sep. 16, 1977

[51] Int. Cl.$^2$ ............................................... C09C 1/42
[52] U.S. Cl. ................................. 106/288 B; 106/72; 106/309
[58] Field of Search ...................... 106/288 B, 72, 309

[56] References Cited

U.S. PATENT DOCUMENTS

| 3,106,476 | 10/1963 | Millman et al. | 106/309 |
|---|---|---|---|
| 3,134,549 | 5/1964 | Quackenbush et al. | 241/171 |
| 3,266,917 | 8/1966 | Sawyer et al. | 106/288 B |
| 3,798,044 | 3/1974 | Whilley et al. | 106/309 |
| 4,018,673 | 4/1977 | Hughes et al. | 106/288 B |

*Primary Examiner*—Winston A. Douglas
*Assistant Examiner*—J. V. Howard
*Attorney, Agent, or Firm*—Inez L. Moselle

[57] ABSTRACT

Method for manufacturing a stable, fluid, highly concentrated aqueous suspension of calcined clay which has satisfactory rheological properties and calcined clay particles having desirable low abrasiveness. A dispersed fluid aqueous suspension of the clay containing about 50 to 55% solids is recirculated through one or more vertical agitated mills containing a particulate grinding medium such as 1/16-inch zirconia spheres. Portions of dry calcined clay are added in increments to the suspension during recirculation until the desired high clay solids level, usually 60 to 70%, is obtained.

3 Claims, 1 Drawing Figure

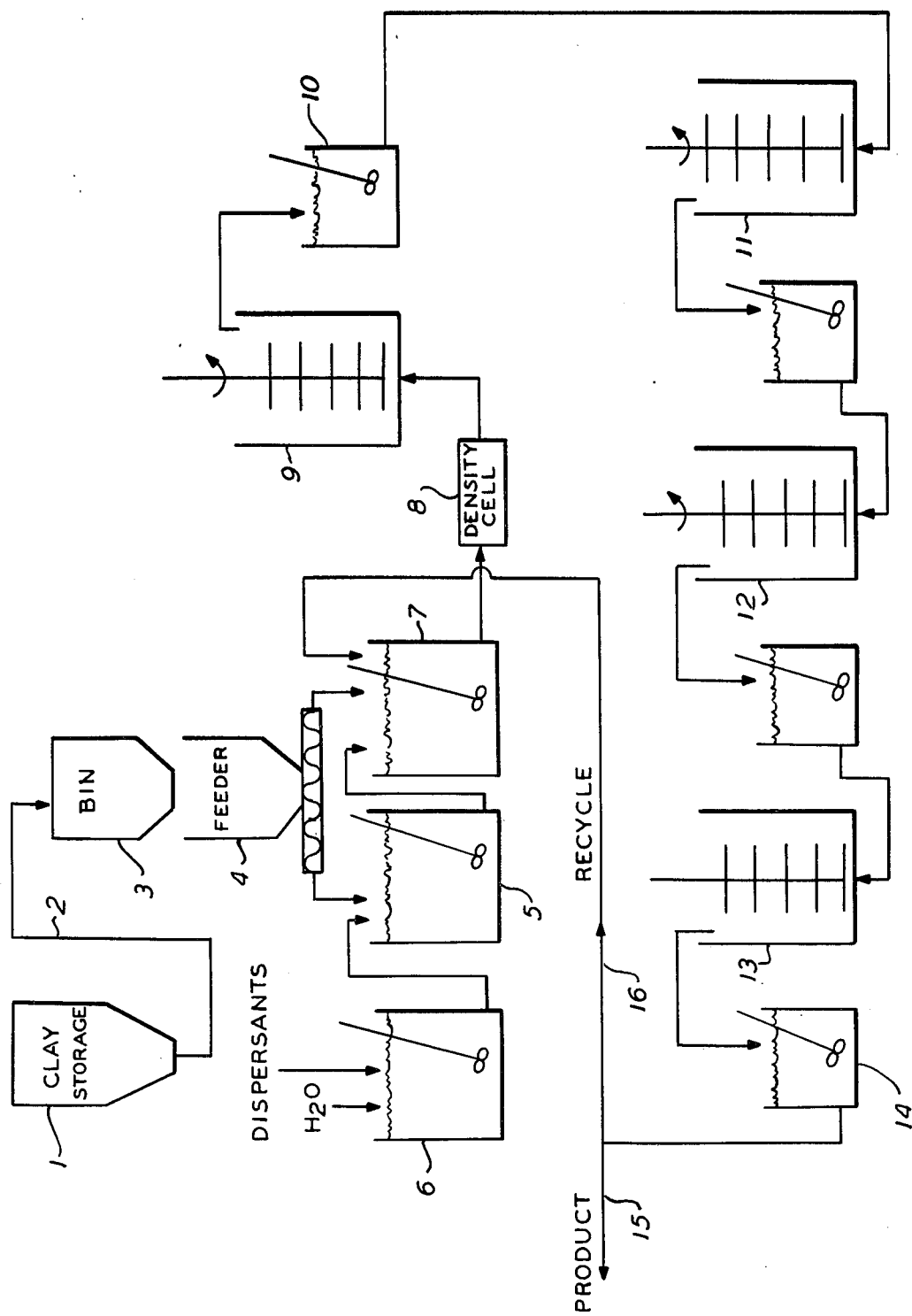

METHOD FOR PRODUCING CLAY SLURRIES

BACKGROUND OF THE INVENTION

Kaolin clay pigments used by the paper and paint industry are available in both uncalcined (hydrated) and calcined (dehydrated) grades. When preparing aqueous coating or paper filling compositions containing such pigments, it is frequently desirable to provide the clay in the form of a concentrated suspension (slurry) which is sufficiently fluid at both high and low rates of shear to be handled by conventional mixers and pumps.

When the clay is hydrated and has a limited content of particles larger than 2 microns (equivalent spherical diameter), it is relatively simple to produce a stable high solids (70%) suspension of the clay. A strong deflocculant (dispersant) such as tetrasodium pyrophosphate (TSPP) is added to a filter cake of the acid clay. The cake of hydrated clay is typically at about 60% solids. Additional dry clay is incorporated with mild agitation to such cake until the suspension has the desired high solids content. The TSPP is usually employed in amount within the range of 0.3% to 0.5% based on the dry clay weight. This corresponds to the use of 6 to 10 lbs. TSPP/ton of clay. The resulting suspension is stable in the sense that when the suspension is allowed to stand there is minimal settling of particles to form a dense sediment and minimal formation of a clear or cloudy supernatant liquid layer. This is attributable to the fact that suspensions of fine hydrated clay are fairly viscous and contain only small amounts of coarse particles. Few particles of clay, if any, have sufficient mass to settle under the influence of gravity.

In the case of clay pigments that contain significant amounts of coarse particles, especially particles larger than 2 microns, and which contain a low content of ultrafine particles, there is a marked tendency of coarse particles to settle out of deflocculated suspensions of the clay. For example, 70% solids deflocculated suspensions of relatively coarse filler grades of hydrated kaolin clay tend to form hard sediments during shipment or storage. These filler clays usually contain at least 20% by weight of particles larger than 5 microns and at least 35% larger than 2 microns.

A conventional method for maintaining various particulate solids in suspension in fluid media is to thicken the suspending media with suitable colloidal additives. This principle has been advocated to prevent sedimentation in high solids suspensions of filler grades of clay. In accordance with the teachings of U.S. Pat. No. 3,130,063 to Millman et al, an inorganic polymeric thickening agent, preferably CMC, is added to a previously deflocculated suspension of coarse filler clay in amount sufficient to thicken (and thereby stabilize) the suspension. However, organic polymers such as CMC are subject to bacterial degradation. Consequently, clay slurries stabilized with such polymers may arrive at their destination in the form of gray or black masses having a putrid odor. Obviously it is desirable to avoid stabilizing a deflocculated clay suspension with such thickening agents since preservatives are costly.

High solids deflocculated suspensions of calcined clay pigments have particle size distributions similar to those of hydrated filler clays. Such suspensions tend to form hard sediments during storage. Furthermore, calcined clay pigments have unusual rheological properties. The production of stable high solids suspensions is more difficult to achieve than when a typical hydrated clay is involved. In fact, calcined kaolin clays usually cannot be prepared into suspensions containing more than 60% solids by conventional techniques without producing systems which are highly dilatant. These dilatant systems resemble quicksand. When a ruler is dropped into a fluid concentrated slurry of calcined clay, it may be impossible to remove the ruler unless the ruler is removed very slowly. The shearing force applied to the suspension results in the conversion of the originally fluid system into a mass which becomes increasingly viscous at the rate of shear increases. Processing equipment such as mixers and pumps would be damaged by such highly dilatant suspensions or the equipment would stop operating.

The unusual dilatancy of concentrated aqueous suspensions of calcined kaolins is not the only difficulty to be resolved in the production of slurries suitable for shipment, handling and storage. Calcined kaolin pigments exhibit the undesirable settling characteristics of coarse hydrated filler clays. In fact, sediments of calcined clay which form during storage frequently tend to be even more difficult to break up.

PRIOR ART

It has been suggested (U.S. Pat. No. 3,014,836 to Proctor) to reduce the viscosity of calcined clay by milling the calcined clay under wet or dry conditions. The preferred procedure, as set forth in the Proctor patent, is to deflocculate a 55% to 60% solids suspension of the calcined clay with a conventional amount of a dispersant (0.3% TSPP) and ball mill the suspension for 12 to 24 hours. The slip of ball milled clay is then flocculated by adding acid or alum. The flocculated calcined clay is subsequently dried and then it is mixed with water and dispersing agent to produce a 70% solids suspension. Proctor did not attempt to produce directly the desired 70% solids suspensions of calcined clay and he was not concerned with the sedimentation properties of his suspensions.

U.S. Pat. No. 3,754,712 to Cecil discloses a method for preparing fluid high solids suspensions of calcined clay which are stable without the necessity for adding a colloidal thickening agent. The Cecil method involved pebble milling a slurry of calcined kaolin on a batch basis, gradually adding more clay to increase solids. In the illustrative example milling was carried out in a ball mill loaded with a mixture of "Burundum" cylinders, some of which were 13/16 × 13/16 inch and the others ½ × ½ inch. Total milling time to produce a 70.5% solids suspension of SATINTONE ® No. 1 calcined kaolin pigment was 7 hours. Principal disadvantages of this method are that it requires excessively long grinding times and is wasteful of energy since, in practice, the grinding media tend to stick together and running time is wasted while the media that stick together break loose. Furthermore, the technique is geared towards batch operation and would be difficult and expensive to scale up to a continuous process. While the Cecil technique does bring about a modest decrease in the particle size of the calcined clay, it does not significantly reduce the abrasiveness characteristic of calcined clay pigments.

An object of applicant's invention is to overcome the limitations of the Cecil process.

THE INVENTION

Applicants have invented a method or procedure for preparing stable high solids slurries of calcined kaolin clay which require substantially less time — typical only about 1/5 of that required using the prior art batch pebble milling technique. Applicants utilize a grinding medium which does not stick in operation so that no running time is wasted while aggregates of the media break loose. Applicants' method may be carried out on a batch scale but it can be simply and economically scaled up to a continuous process. In addition, the processing brings about a significant reduction in the abrasiveness of the calcined clay, thus substantially enhancing the value of the product.

Applicants' invention involves the use of one or more vertical impeller agitated mills of the type known as a RED HEAD® mill and widely used with an Ottawa silica sand grinding medium for dispersing pigments at low solids (e.g., 30%). Instead of the media normally used with the mill, applicants utilize a relatively heavy media, preferably 10/20 mesh zircon beads. In carrying out their invention, a low solids slurry of calcined clay, typically at 50 to 55% solids, is recirculated through the RED HEAD MILL and the solids level of the slurry is gradually increased by adding portions of dry calcined clay until the desired solids level, usually in the range of about 65 to 70%, is obtained. Optionally, circulation through the mill is continued after the desired solids level is reached when it is desired to produce suspensions highly stable and fluid without the need to add a colloidal stabilizer.

Applicants' results represent a marked improvement over 60 to 70% slurries of the original calcined clay that are obtained by conventional mixing techniques since the latter slurries exhibit severe shear thickening when subjected to stress and consequently cannot be pumped or stored.

The accompanying FIGURE illustrates schematically a system for applying the invention on a continuous production scale.

DESCRIPTION OF PREFERRED EMBODIMENTS

RED HEAD MILLS are well-known sand grinding units in the pigment dispersion art. The so-called "P" series machines which are preferred in practice of our invention are covered by U.S. Pat. No. 3,134,549 to Quackenbush et al, assigned to Chicago Boiler Company. Reference is made to this patent for its disclosure of details of the construction and mode of operation of such mills. Generally, the mills comprise a vertical cylindrical mixing vessel having an inlet at or near the base and adapted to house a charge of particulate grinding media that substantially fills the vessel. A cylindrical screen enclosed area at the top of the vessel has a diameter greater than that of the vessel and serves to prevent the grinding media from passing out of the vessel while permitting unimpeded flow of the slurry being pumped upwardly therethrough. A vertical rotatable shaft extends through the screen enclosed area and into the vessel along its cylindrical axis. A plurality of impellers are mounted on the part of the shaft that is disposed with the vessels. A smaller number of impellers having a larger diameter are mounted on the part of the shaft that extends through the screen enclosed area.

The preferred grinding medium is 10 to 20 mesh (Tyler) spherical zirconia which fills about ⅔ of the mill, the voids between the media comprising the remaining ⅓ of the total volume. Feed slurry in an agitated slurry tank is pumped upwardly through the mill and through a screen at the top which prevents egress of the media. The overflow is discharged to the top of an agitated slurry tank to which dry clay may be continuously metered. Slurry is discharged from an outlet near the bottom of the agitated slurry tank to the bottom of the RED HEAD MILL.

Calcined clays used in practice of the invention include kaolin clay pigments produced by calcination at temperatures within the range of about 1350° to 2200° F. Commercial products are known as "SATINTONE"® clay and "ANSILEX"® clay. Prior to slurry formation, the calcined clay may be blended with minor amounts (e.g., 1% to 20% based on the weight of the clay) of mineral pigments such as titania, hydrated kaolin clay, calcium carbonate or mixtures thereof.

Known clay dispersants such as alkali metal condensed phosphates, exemplified by tetrapotassium (or tetrasodium) pyrophosphate, sodium citrate, sodium naphthalene formaldehyde condensates examplified by Tamol 850, are used as the deflocculating agent to prepare the feed to the mill. The dispersant is usually employed in amount within the range of 0.01% to 0.1%, based on the dry weight of the clay. When appreciably less than about 0.02% is used, 70% solids suspensions of desired viscosity cannot be prepared. On the other hand, when appreciably more than 0.05% dispersant is used, an undesirable hard sediment may form when the high solids slurry of calcined clay is allowed to stand. It will be noted the preferred dispersant level of 0.02% to 0.05% corresponds to 0.1 to 1.0 pounds dispersant per ton of clay. As mentioned above, clay dispersants are normally used in proportions corresponding to 6 to 10 lbs./ton.

Typically commercial calcined clay pigments contain from 10% to 30% by weight of particles larger than 5 microns (e.s.d.) and at least 35% larger than 2 microns.

In putting our invention into practice, the initial slurry is prepared at a calcined clay solids (wt.) level in the range of 45% to 60%, usually 50 to 55%. This initial slurry is produced by adding dispersant and clay to an appropriate quantity of water in an agitated vessel. The ingredients may be prepared into a slurry before adding them to the mill or they may be charged separately to the mill. If the solids content of the charge to the mill is too high, the mill will fail to operate after a short time because of the dilatant nature of the calcined clay. Provided the initial slurry is sufficiently dilute for the mill to operate, the clay will be reduced in viscosity as the slurry is recirculated and pumped upwardly through the particulate grinding medium in the mill.

Generally from 1½ to 2 hours total milling time is required to produce 65 to 70% solids slurry having an apparent Brookfield viscosity of 1000 cp. or below (No. 3 spindle). During milling, the temperature of the slurry increases, generally reaching 120° to 150° F. by the end of the milling period.

As mentioned, an advantage of the process is that the abrasiveness of the calcined clay pigment is reduced. This is especially desirable when the pigment is used as a paper filling or coating material. For example, a commercial calcined kaolin pigment having a Valley Abrasion (U.S. Pat. No. 3,014,836) of 200 has been converted to a more desirable material having an abrasion value of 40. A calcined clay pigment widely selected for paper use because of its low abrasiveness (30 by the Valley method) has been further improved by reducing abrasiveness to 20.

The high solids slurries produced by practice of the invention do not require addition of a suspending agent such as CMC provided recirculation time is sufficiently long.

Referring to the FIGURE which illustrates schematically a suggested method of applying this invention on a continuous, production scale, dry calcined clay, stored in a conventional silo 1, is conveyed through pipe 2 to a bin 3 which is discharged with a conventional vibrating bin discharger (not shown) to a conventional volumetric or gravimetric feeder 4. This feeder feeds into two makedown tanks 5, 7, independently. The first makedown tank 5 is continuously fed with a solution of water and dispersants (such as TSPP and AMP 95), which is prepared in a separate mix tank 6. The feed rates of dry calcined clay and aqueous dispersant solution are adjusted to give a 50 to 55% solids slurry in tank 5. Tank 5 is agitated with a conventional, low energy input mixer.

The second makedown tank 7 is part of a system whereby calcined clay slurry is milled in one or more RED HEAD-type mills connected in series [four (9, 11, 12 and 13) are shown in the FIGURE]. Part of the slurry passing through this system is removed as product 15 and part is recycled through piping 16 back into tank 7. Tank 7 is also fed with dry clay from the volumetric feeder 4 and with 50 to 55% slurry from tank 5. The flow rates of dry clay, recycle and 50 to 55% slurry from tank 5 are adjusted to give a 66 to 68% solids slurry in tank 7. Tank 7 contains a relatively high horsepower agitator in order to impart some work input to the slurry.

Slurry is pumped out of tank 7 through a density cell (which measures percent solids) and into the first RED HEAD MILL 9. Overflow from this mill is stored in a small agitated tank 10 before being pumped into the next mill 11. Any number of mills can be arranged in this series configuration. Part of the slurry pumped from the last RED HEAD MILL mix tank 14 is taken out of the system as product 15, and part is recycled back to tank 7. The ratio of product to recycle will determine not only production rate but the rheological properties of the slurry; a lower ratio will result in more work input being applied per ton of clay produced, hence lower dilatancy and better settling properties.

The following example illustrates the preparation of a stable slurry of SATINTONE NO. 1 calcined clay pigment at 68% solids by practice of the invention. Seven hours was required to produce a 70.5% solids suspension by the batch pebbling milling technique in the illustrative example of the Cecil patent.

The mill was a "L5-P" continuous feed RED HEAD MLL. The height of the cylindrical mill was 15 inches, of which 5 inches was an upper enlarged screen enclosed area. The inner diameter of the portion of the mill below the screen enclosed area was 4 inches. The inner diameter of screen enclosed area was 5 inches. Mill capacity was 0.19 gallons of liquid, with rotor and media in place. A κ-inch vertical rotatable shaft extended through the screen enclosed area at the top of the mill and was set with a clearance of about ⅜-inch from the bottom of the mill. The mill had four 3-inch nylon disc impellers mounted on the part of the shaft below the screen enclosed area and 4-inch nylon disc within the screen enclosed area. The mill was equipped with a variable speed feed pump capable of handling up to 20 gallons per hour. The pump was in communication with an outlet near the base of a 2 gallon tank located to receive overflow from the top of the RED HEAD MILL and pumped the charge in the tank to the bottom of the mill. The mill was charged with 4800 grams of Zirbeads, a commercial spherical zircon grinding medium, of 10/20 mesh size.

Five grams tetrasodium pyrophosphate was dissolved in ½ gallon of deionized water. The solution was charged to a makedown vessel and 1880 grams SATINTONE NO. 1 was added with agitation, producing a 50% solids slurry. The slurry was charged to a 2 gallon agitator tank open at the top. The impeller agitator in the tank was turned off and operated at a speed of 200 r.p.m., sufficient to maintain the solids in suspension. The RED HEAD MILL was turned on and operated at a shaft speed of 2400 r.p.m. The slurry was pumped from the agitator tank upwardly through the mill and then back into the tank and recirculated through the mill at the rate of 250 ml./min. The 50% solids slurry was recirculated through the mill for about 15 minutes to reduce the viscosity sufficiently to permit additional clay to be added while maintaining the viscosity of the slurry at a level at which the slurry could be pumped and recirculated. Dry SATINTONE clay (2120 g.) was then gradually charged over a period of about ½ hour to the 2 gallon tank where it was immediately mixed with the charge circulating between this tank and the mill. The total charge of clay was 4000 grams. After all of the clay was added, the slurry was continuously circulated to the tank and pumped through the zircon medium in the mill for 2 hours. Small amounts of water were added to compensate for evaporation loss resulting from the fact that slurry temperature approached 130° F. The pump was shut off and residual slurry was discharged from the mill.

The Valley abrasion value of the original SATINTONE pigment was 200 mg. The abrasion value of the pigment in the processed slurry was about 60 mg.

We claim:

1. A method for producing a concentrated stable fluid slurry of a calcined kaolin clay pigment which comprises providing a fluid dispersed suspension of said pigment in water, said suspension containing from about 45 to 60% solids, pumping said suspension upwardly through a bed of spherical particulate zircon grinding medium in a vertical agitator mill to an agitated tank and continuously recirculating said slurry through said mill and said tank until the viscosity of said suspension is reduced, said grinding medium being retained in said mill while the slurry is being recirculated, adding dry calcined clay in increments to the suspension in said tank while continuing to recirculate said suspension through said mill and said tank until sufficient dry clay is added to produce a fluid slurry containing at least 65% clay solids.

2. The method of claim 1 wherein said suspension is circulated through a plurality of said mills and the method is carried out on a continuous base.

3. The method of claim 2 wherein said mills are connected in series.

* * * * *

UNITED STATES PATENT AND TRADEMARK OFFICE
CERTIFICATE OF CORRECTION

PATENT NO. : 4,118,245
DATED : October 3, 1978
INVENTOR(S) : Herbert R. Hamill et al It is certified that error appears in the above–identified patent and that said Letters Patent are hereby corrected as shown below:

Column 5 - line 57 should read -- media in place. A 1/2 inch vertical rotatable shaft ex --.

Signed and Sealed this

Twenty-sixth Day of December 1978

[SEAL]

Attest:

RUTH C. MASON
Attesting Officer

DONALD W. BANNER
Commissioner of Patents and Trademarks